United States Patent [19]

Jenks

[11] 4,257,459

[45] Mar. 24, 1981

[54] METHODS OF AND APPARATUS FOR LINING THE INTERNAL WALLS OF A CONDUIT FOR CONVEYING FLUID CARRYING MARINE FOULING ORGANISMS WITH A LINER OF ANTI-FOULING MATERIAL

[75] Inventor: Richard H. Jenks, Sauquoit, N.Y.

[73] Assignee: Revere Copper and Brass Incorporated, New York, N.Y.

[21] Appl. No.: 14,486

[22] Filed: Feb. 23, 1979

[51] Int. Cl.$^3$ .............................................. F16L 9/14
[52] U.S. Cl. .................................. 138/147; 138/140; 138/143; 405/150
[58] Field of Search ............... 138/140, 139, 143, 147, 138/155, 154, 175, 176, DIG. 6; 29/450, 451, 523; 166/244 C, 206, 207; 264/267, 269, 271, 275; 405/150, 151, 153

[56] References Cited

U.S. PATENT DOCUMENTS

| | | | |
|---|---|---|---|
| 341,327 | 5/1886 | Fay | 166/207 |
| 904,189 | 11/1908 | Everson | 138/140 X |
| 2,148,783 | 2/1939 | Spaulding | 405/150 |
| 2,243,273 | 5/1941 | Edwards | 138/140 |
| 2,386,747 | 10/1945 | Ris | 138/140 X |
| 2,790,464 | 4/1957 | Stephens et al. | 138/140 X |
| 3,169,376 | 2/1965 | Cunningham | 405/150 |
| 4,117,201 | 9/1978 | Keifert | 138/DIG. 6 |

FOREIGN PATENT DOCUMENTS 766301  1/1957  United Kingdom .................... 138/140

Primary Examiner—James E. Bryant, III
Attorney, Agent, or Firm—Carella, Bain, Gilfillan & Rhodes

[57] ABSTRACT

The internal walls of a conduit for conveying fluid carrying marine fouling organisms is lined with a liner of anti-fouling material by inserting an expandable liner of anti-fouling material into the conduit and by expanding the liner radially outwardly into tight engagement with the internal walls with sufficient force to prevent movement of the liner with respect to the conduit upon the fluid flowing therethrough. The liner of anti-fouling material prevents the marine fouling organisms from contacting the internal walls of the conduit and thereby prevents the marine fouling organisms from adhering to or collecting on the internal walls and thereby prevents such marine fouling organisms from constricting the flow of fluid through the conduit. The liner of anti-fouling material may be comprised of a plurality of generally annularly shaped and radially expandable bands of such material which are inserted into the conduit and aligned axially and adjacent each other. A plurality of bands of radially outwardly expandable material may be inserted into the bands of anti-fouling material and positioned over the adjacent edges of adjacent bands of anti-fouling material and expanded radially outwardly to force at least the underlying portions of the bands of anti-fouling material into tight engagement with the internal walls of the conduit and with sufficient force to prevent the bands of anti-fouling material to move with respect to the conduit upon the fluid flowing therethrough.

8 Claims, 4 Drawing Figures

METHODS OF AND APPARATUS FOR LINING THE INTERNAL WALLS OF A CONDUIT FOR CONVEYING FLUID CARRYING MARINE FOULING ORGANISMS WITH A LINER OF ANTI-FOULING MATERIAL

BACKGROUND OF THE INVENTION

1. Field of the Invention

This invention relates generally to methods of and apparatus for lining the internal walls of a conduit, and in particular it relates to methods of and apparatus for lining the internal walls of a conduit for conveying fluid carrying marine fouling organisms with anti-fouling material for preventing such marine fouling organisms from contacting the internal conduit walls and thereby from adhering thereto and constricting the flow of fluid through the conduit.

2. Description of the Prior Art

As is known to those skilled in the marine art, marine fouling organisms will eventually adhere to or collect on the surface of any object exposed to the sea water. Such marine fouling organisms include all marine growth capable of forming a more or less secure attachment to a surface exposed thereto, or which contribute a more or less adherent deposit to a surface exposed thereto. Marine fouling organisms can be divided into two groups, namely the group of uni-cellular micro-organisms composed of many species of bacteria and other plant life, and various types of protozoa, and the group of macro- or multi-cellular organisms, both plant and animal. Such marine fouling organisms include practically all of the marine bacteria, flora, invertebrate fauna present in sea water and especially include barnacles and other marine crustaceans found in sea water.

As further known to those skilled in the marine art, sea water is used as a coolant for steam condensers utilized in electrical generating plants. The sea water is conveyed to and from the condensers by large diameter concrete pipes or conduits. Over a relatively short period of time, marine fouling organisms carried by the sea water adhere to or collect on the internal walls of the concrete pipes and constrict the flow of sea water through the pipes so severely that the electrical generating plant must be closed down for an extended period of time sufficient to permit the internal walls of the pipes to be mechanically cleaned such as by scraping and/or air blasting. Since this cleaning operation results in the electrical generating plant being shut down, it is enormously expensive and highly undesirable.

Various anti-fouling materials are known to the art which are capable of preventing marine fouling organisms from contacting the surface protected by the liner and to which marine life does not substantially adhere. Such known anti-fouling materials include copper and various copper base alloys.

As reported in the reprint from *POWER ENGINEERING MAGAZINE* entitled, "Special Linings In Concrete Intakes Prevent Fouling From Marine Growth," authored by Harold A. Todhunter, Mechanical Design Engineer, Los Angeles Dep-. of Water and Power, and which reprint is provided by the International Nickel Co., Inc., 67 Wall Street, N.Y., N.Y. 10005, sheets of anti-fouling material, for test purposes, have been nailed to the walls of a concrete intake to prevent fouling of the intake walls by marine growth. The anti-fouling material used was a copper base alloy, viz., a 90 -10 copper-nickel alloy, and the nails used were Inconel 750X nails installed with Ramset guns. Obviously, such installation of anti-fouling material requires that the concrete intake be drained and equally obvious is that such an installation would be undesirably time consuming and enormously expensive if used in conjunction with an operating electrical generating plant because it would require the electrical generating plant to be shut down during installation.

Accordingly, there exists a need in the art of an anti-fouling liner which may be readily and relatively inexpensively inserted inside of a conduit, e.g. a sea water conveying conduit, and which liner has the capability of being inserted into the conduit while the sea water is still present although the flow of sea water through the conduit may have to be temporarily halted or slowed. Thus, even if an associated electrical generating plant must be shut down, the shut down would be only quite temporary and of a much shorter duration than required by the above-noted prior art.

SUMMARY OF THE INVENTION

The anti-fouling liner of the present invention and the method of the present invention for inserting the same in a conduit, such as a concrete conduit for conveying sea water carrying marine fouling organisms, overcome the above-noted prior art problem by providing a radially outwardly expandable liner of anti-fouling material which may be inserted into a conduit and expanded radially outwardly into engagement with the internal walls of the conduit with sufficient force to prevent the liner from moving with respect to the conduit upon the flow of fluid, e.g. sea water, therethrough. Such liner may include a plurality of generally annularly shaped and radially expandable bands of anti-fouling material which may be inserted into the conduit and aligned axially and adjacent each other, and a plurality of bands of radially outwardly expandable material may be inserted into the bands of anti-fouling material and positioned over adjacent edges of adjacent bands of anti-fouling material and expanded radially outwardly to force at least the underlying portions of the bands of anti-fouling material into tight engagement with the internal walls of the conduit and with sufficient force to prevent the bands of anti-fouling material to move with respect to the conduit upon the flow of fluid therethrough.

DESCRIPTION OF THE PREFERRED EMBODIMENT

Figure 1:
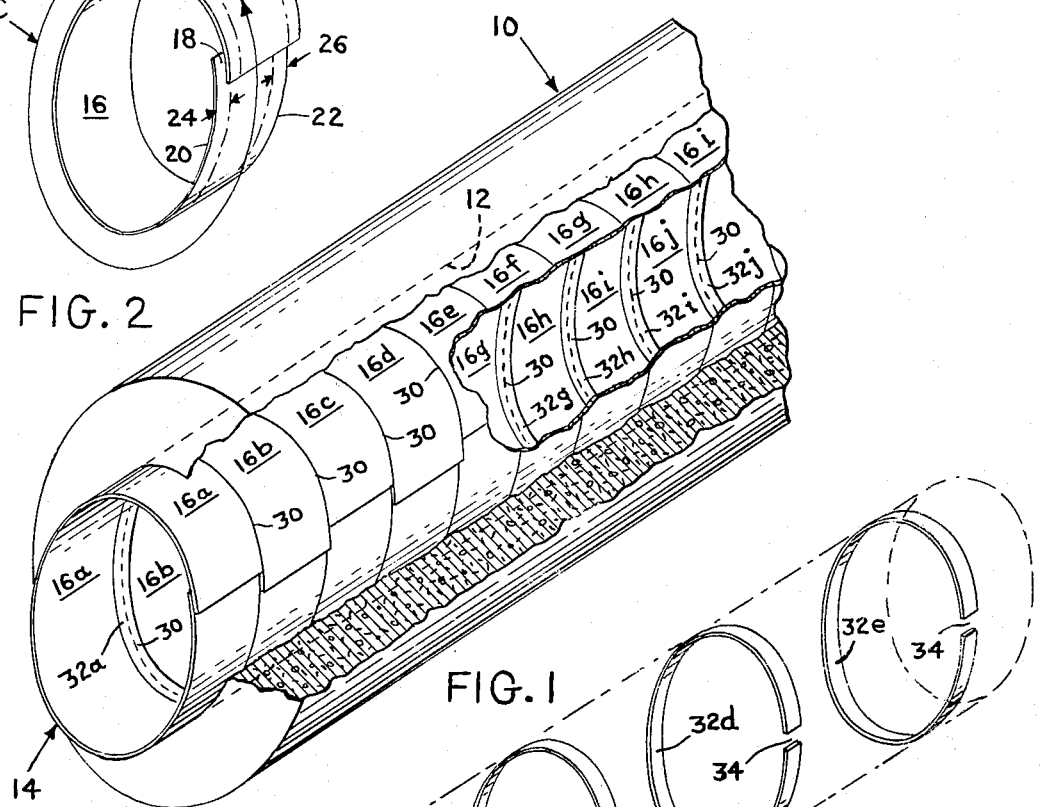
FIG. 1 is a diagrammatic illustration, in perspective, of a conduit provided with a liner in accordance with the teachings of the present invention and with portions of the sides of the elements shown being broken away for clarity of presentation.

Referring now to FIG. 1, there is shown a conduit indicated by general numerical designation 10 and having internal walls 12. The conduit 10 may be, for example, a concrete pipe for conveying sea water to or from the steam condensers of an associated electrical generating plant and which sea water carries marine fouling organisms which, upon contact with the internal walls 12, would adhere to or collect on the internal walls 12 and in time severely constrict the flow of sea water through the conduit. Also illustrated in FIG. 1 is a liner according to the present invention and identified by general numerical designation 14.

The liner 14 may be comprised of a plurality of generally annularly shaped bands of material, such as for example anti-fouling material, and which bands are indicated respectively by numerical designations 16a . . . 16i.

Figure 2:
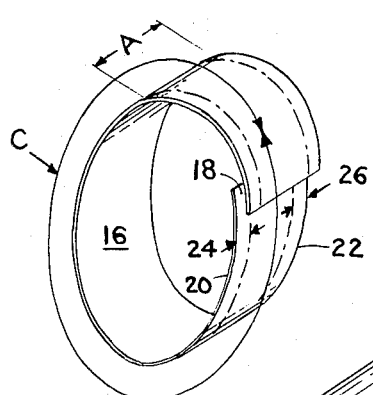
FIG. 2 is a diagrammatic illustration, of one of the annular bands comprising the liner of the present invention.

It will be further understood by way of example, and as illustrated individually with regard to band 16c in FIG. 2, that each band 16 is provided with a circumferential length C and an axial length A and that each band is split across its entire axial length, as indicated at 18, to permit the bands to be expanded radially outwardly. Still referring to FIG. 2, it will be further understood that each of the bands 16 terminates axially in a pair of spaced apart generally circular transverse edges 20 and 22 and that each of the bands 16 has outer axial portions adjacent the generally circular transverse edges 20 and 22 and which portions are indicated by numerical designations 24 and 26. It will be understood that the split 18 and the axial portions 24 and 26 illustrated in FIG. 2 are exaggerated in proportional size for clarity of presentation.

Referring again to FIG. 1, it will be understood that the radially outwardly expandable bands 16a . . . 16i are inserted within the conduit 10 and are aligned generally axially internally of the conduit adjacent, or juxtaposed, to each other with their respective adjacent generally circular transverse edges 20 and 22 positioned adjacently and forming generally circular edge lines 30 transverse of the conduit 10. It will be understood that in accordance with the teachings of the present invention such bands may be axially aligned adjacent each other, i.e. not in actual edge-to-edge contact but in close and slightly spaced relationship, or such bands may be aligned axially with their respective generally circular transverse edges 20 and 22 in abutting engagement, that is in actual contact. Such axial alignment of the bands whether adjacent or in abutting engagement will depend upon various considerations such as convenience and ease of axial alignment of the bands which may make some axial space therebetween permissible and desirable, and especially for commercial considerations, and it will be understood that some axial space may be permitted between the respective generally circular transverse edges 20 and 22 of the bands and that the liner according to the present invention will function as desired, particularly where the liner is made of anti-fouling material.

Figure 3:
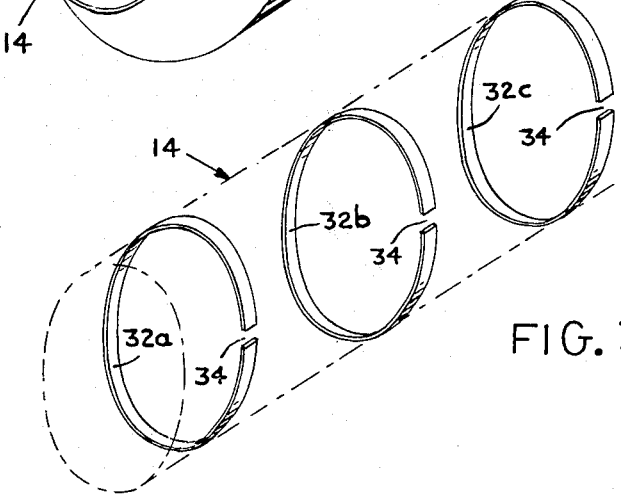
FIG. 3 is a diagrammatic illustration of a plurality of radially outward expandable bands for maintaining the bands comprising the liner of the present invention in engagement with the internal walls of the lined conduit.

Referring now to FIG. 3, there is shown a plurality of generally annularly shaped bands of material, such as for example annular bands of suitable cold worked copper - silicon alloy, which bands are indicated by numerical designations 32a . . . 32c. It will be understood that each of the bands 32a . . . 32c is provided with a circumferential length substantially the same as the circumferential length C of the bands 16a . . . 16i but that the axial length of each band 32 is substantially less than the axial length A of the bands 16. It will be further understood that each of the bands 32, as indicated at 34, is split across its entire axial length to permit radially outward expansion of the bands. The bands 32a . . . 32e are inserted internally of the axially aligned bands 16a . . . 16i with each of the bands 32 being positioned generally over one of the generally circular edge lines 30 and overlying the outer axial portions 24 and 26 of the adjacent bands 16 forming the edge line over which the band 32 is positioned. It will be further understood that each of the bands 32, in accordance with the further teachings of the present invention, is expanded radially outwardly to force at least the underlying outer axial portions 24 and 26 of adjacent bands 16 into tight engagement with the internal walls 12 of the conduit 10 and with sufficient force to prevent the bands 16 from moving with respect to the conduit 10 upon fluid, such as sea water, flowing through the conduit.

Figure 4:
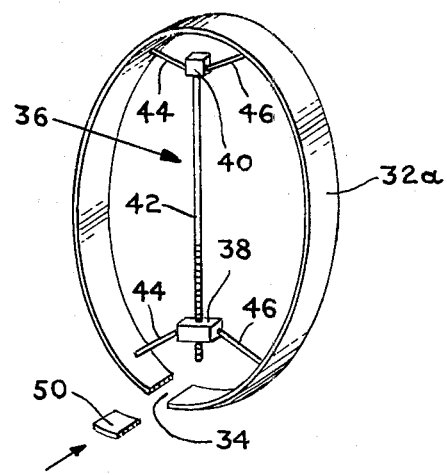
FIG. 4 is a diagrammatic illustration of one method of expanding the bands illustrated in FIG. 3 radially outwardly and for maintaining such bands so expanded.

Referring now to FIG. 4, there is illustrated diagrammatically a method of expanding each radial band 32, with radial band 32a being shown individually by way of example. An expander, indicated by general numerical designation 36, includes a pair of displaced blocks 38 and 40 interconnected by a rod 42 fixedly secured to the upper block 40 and extending threadedly through the lower block 38 and in engagement with a threaded bore formed through the lower block 38. Each block is provided with a pair of outwardly extending arms 44 and 46 the ends of which may be inserted into holes or indentations formed in the inner surface of the band 32a for receiving the ends of the arms 44 and 46. Upon rotation of one direction being imparted to the rod 42, the rod is moved upwardly with respect to the lower block 38 causing the blocks 38 and 40 to be moved diametrically away from each other and in turn causing the respective arms 44 and 46 to expand the band 32a radially outwardly into tight engagement with the underlying axial portions 24 and 26 of axially aligned and adjacent pair of bands 16. After such radial expansion of the band 32 a, a suitably sized wedge 50, of suitable material such as the same material of which the bands 32 are formed, may be inserted into the split 32 to maintain the band 32 in the radially outwardly expanded position. Then, the rod 42 may be rotated in the opposite direction to move the blocks 38 and 40 towards each other and to release the respective arms 44 and 46 from the annular band 32a.

Alternatively, each of the bands 32 may be provided with a turnbuckle spanning the split 34 with the opposite ends of the turnbuckle being secured to portions of the annular band 32 adjacent the split 34. Upon rotation of the turnbuckle bolt the opposite ends of the turnbuckle would be forced away from each other thereby expanding the annular band 32 radially outwardly whereupon a suitable wedge, such as wedge 50, may be inserted within the split 34 to maintain the annular band 32 in its radially outwardly expanded position.

In one embodiment of the present invention, conduit 10 was a length of steel reinforced concrete of 12 feet in diameter and each annular band 16 was of anti-fouling material, i.e. a copper nickel alloy of 90% copper and 10% nickel by weight, and each band 16 had a circumferential length C of 40 feet, an axial length A of 37 inches and a thickness of 0.025 inch. The annular bands 16 may have a thickness of from 0.020–0.060 inch, and preferably a thickness of 0.040 inch. In the same embodiment, the annular bands 32 were made of a copper-silicon alloy of 97% copper and 3% silicon by weight and had a circumferential length C of 37.45 feet, an axial length of 3 inches and were 0.025 inch thick. The bands 32 may have a thickness of from 0.125 inch to 0.375 inch and preferably a thickness of 0.250 inch.

It will be further understood by those skilled in the art that when the annular bands 16 are made of copper (as they may be) or a copper alloy anti-fouling material, such as 90–10 copper-nickel alloy described above, and wherein the fluid flowing through the conduit 10 is sea water carrying marine fouling organisms, that there will be a slow solution of the copper present in the copper or the copper base alloy sufficient to prevent growth of marine fouling organisms, such as barnacles and similar marine organisms, on the internal surfaces of the annular bands 16. Hence, upon the annular bands 16 being of such anti-fouling material, such material serves the dual purpose of preventing physical contact between marine fouling organisms and the internal walls 12 of the conduit 10 and providing a slow solution of copper sufficient to prevent growth of, adherence to or collection on, marine fouling organisms on the internal surfaces of the bands 16. Hence, upon a conduit 10 being aligned with such anti-fouling liner in accordance with the teachings of the present invention, sea water carrying marine fouling organisms, for example, may flow through such conduit for extremely lengthy periods of time without any constriction of the flow through the conduit.

In summary, it will be understood by those skilled in the art that the liner of the present invention, and the method of inserting the same, provide a liner, particularly of anti-fouling material, which may, comparatively, be readily, easily and inexpensively inserted in a conduit and, when the liner is of anti-fouling material, may be readily, easily and inexpensively inserted in a length of concrete pipe for conveying sea water carrying marine fouling organisms. Further, it will be understood that the liner of the present invention, and the method of inserting the same, particularly where the liner is of anti-fouling material, may be inserted in a concrete pipe for conveying sea water to and from the steam condensers of associated electric generating apparatus by divers operating under water in the sea water contained by the conduit but that the flow of such sea water may have to be temporarily halted or slowed while the liner is inserted according to the method of the present invention. But, due to the method of the present invention, such anti-fouling liner may be installed in a much shorter time than may be anti-fouling liners known to the prior art and hence any associated electrical generating apparatus will be shut down, if at all, for only a comparatively short length of time thereby providing an enormous advance in the anti-fouling liner art.

It will be still further understood by those skilled in the art that many variations and modifications may be made in the present invention without departing from the spirit and the scope thereof.

What is claimed is:

1. In a conduit for conveying fluid carrying marine fouling organisms and wherein said marine organisms adhere to or collect on the internal walls of said conduit thereby constricting the flow of said fluid through said conduit,

WHEREIN THE IMPROVEMENT COMPRISES:

radially outwardly expandable liner means residing within said conduit and for preventing said marine fouling organisms from contacting and thereby from adhering to or collecting on said internal walls of said conduit;

said liner means of a predetermined anti-fouling material to which said marine fouling organisms do not substantially adhere or collect upon contact therewith; and expansion means residing within said liner means and for expanding said liner means radially outwardly into tight engagement with said internal walls of said conduit with sufficient force to prevent movement of said liner means with respect to said conduit upon said fluid flowing through said conduit.

2. In a conduit for conveying fluid carrying marine fouling organisms and wherein said marine fouling organisms adhere to or collect on the internal walls of said conduit thereby constricting the flow of said fluid through said conduit,

WHEREIN THE IMPROVEMENT COMPRISES:

longitudinally extending, generally cylindrically shaped and radially outwardly expandable liner means residing within said conduit and for preventing said marine fouling organisms from contacting and thereby from adhering to or collecting on said internal walls of said conduit;

said liner means of a predetermined anti-fouling material to which said marine fouling organisms do not substantially adhere or collect upon contact therewith; and expansion means residing within said liner means and for expanding said liner means radially outwardly into tight engagement with said internal walls of said conduit with sufficient force to prevent movement of said liner means with respect to said conduit upon said fluid flowing through said conduit.

3. In a conduit for conveying sea water carrying marine fouling organisms and wherein said marine fouling organisms adhere to or collect on the internal walls of said conduit thereby constricting the flow of said sea water through said conduit,

WHEREIN THE IMPROVEMENT COMPRISES:

a plurality of generally annularly shaped bands of anti-fouling material inserted into said conduit, each of said bands having predetermined circumferential and axial lengths and being split across the entire axial length thereof to permit radially outward expansion of the band, each of said bands terminating axially in a pair of spaced apart generally circular transverse edges and each of said bands having predetermined outer axial portions adjacent said generally circular transverse edges;

said bands of predetermined anti-fouling material being aligned generally axially internally of said conduit adjacent each other with their respective adjacent generally circular transverse edges positioned adjacently and forming generally circular edge lines transverse of said conduit;

a plurality of generally annularly shaped bands of predetermined material inserted into said bands of anti-fouling material, each of said bands of predetermined material having a predetermined circumferential length substantially the same as said circumferential length of said bands of anti-fouling material and having an axial length substantially less than said bands of anti-fouling material, and each of said bands of predetermined material being split across the entire axial length thereof to permit radially outward expansion thereof and said bands of predetermined material also being positioned generally over one of said generally circular edge lines and overlying respective predetermined outer axial portions of said adjacent bands of said anti-fouling material;

each of said bands of predetermined material for being expanded radially outwardly to force at least said respective predetermined outer axial portions of said adjacent bands of anti-fouling material into tight engagement with said internal walls of said conduit and with sufficient force to prevent said bands of anti-fouling material from moving with respect to said conduit upon said fluid flowing through said conduit;

means for maintaining said bands of predetermined material expanded radially outwardly; and said anti-fouling material for physically preventing said marine fouling organisms from contacting and thereby from adhering to or collecting on said internal walls of said conduit and upon exposure to said sea water, said anti-fouling material for providing a slow solution of a predetermined substance sufficient to prevent substantial adherence thereto of said marine fouling organisms.

4. Apparatus according to claim 3 wherein said anti-fouling material is copper.

5. Apparatus according to claim 3 wherein said anti-fouling material is a predetermined copper alloy.

6. Apparatus according to claim 5 wherein said predetermined copper alloy is 90% copper and 10% nickel by weight.

7. Apparatus according to claim 3 wherein said anti-fouling material is a predetermined copper alloy and wherein said predetermined material is a predetermined copper-silicon alloy.

8. Apparatus according to claim 7 wherein said predetermined copper alloy is 90% copper and 10% nickel by weight and wherein said predetermined copper-silicon alloy is 97% copper and 3% silicon by weight.

* * * * *